Patented Oct. 20, 1942

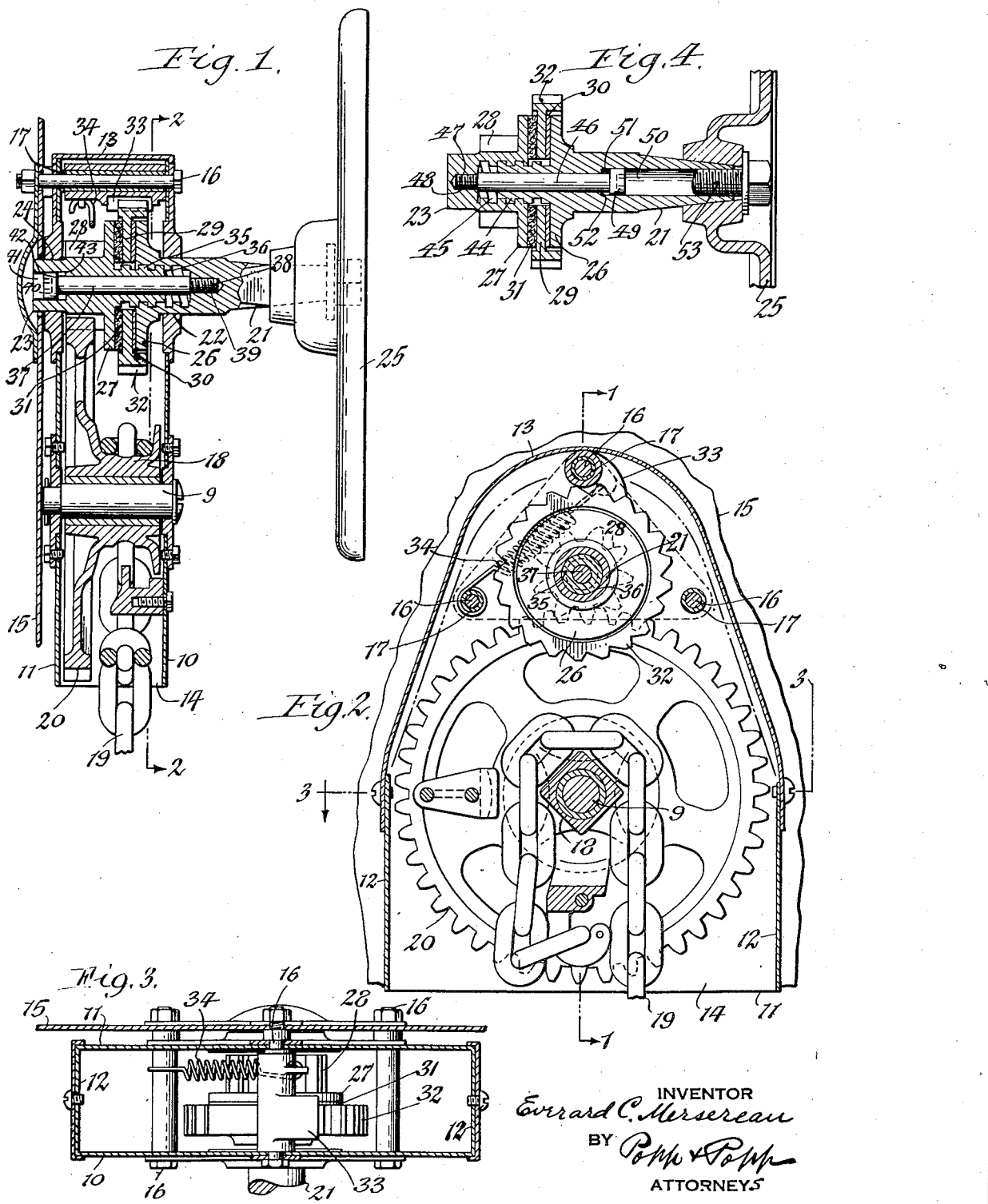

2,299,402

UNITED STATES PATENT OFFICE 2,299,402

HAND BRAKE MECHANISM

Everard C. Mersereau, Great Kills, N. Y., assignor to National Brake Company, Inc., New York, N. Y., a corporation of New York Application July 25, 1941, Serial No. 404,019

5 Claims. (Cl. 74—505)

This invention relates to a hand brake mechanism for railway cars, and the like, and more particularly to a manually operated mechanism of this character which includes a motion transmitting gearing operatively connected with the brake shoes of the car, a manually operated shaft, a friction clutch for connecting and disconnecting said shaft and transmitting gearing, cam means whereby said clutch is coupled for causing the brake mechanism to be applied during forward rotation of said shaft and whereby said clutch is uncoupled and said transmitting gearing is permitted to relax the brake mechanism upon turning said shaft backwardly and said clutch is automatically recoupled by the pull of the transmitting gearing when the backward rotation of the operating shaft ceases, and a detent mechanism which permits forward movement of a part of said clutch but prevents backward movement of the same.

It is the object of this invention to provide improvements in this type of hand brake mechanism which will limit the extent that the members of the clutch can separate from each other, which improvements prevent any pressure from being exerted on the housing of the brake operating mechanism and are not only simple and inexpensive in construction but also efficient in operation and easily accessible for inspection and repairing.

In the accompanying drawing:

Fig. 1 is a vertical longitudinal section of a hand brake mechanism embodying one form of this invention and mounted on an upright end wall of a car, the section being taken on line 1—1, Fig. 2.

Fig. 2 is a vertical cross section taken on line 2—2, Fig. 1.

Fig. 3 is a horizontal section taken on line 3—3, Fig. 2.

Fig. 4 is a fragmentary view similar to Fig. 1, showing another form of this invention.

This application is a division in part and a continuation in part of an application filed by myself March 30, 1939 and serially numbered 265,011.

In the following description similar characters of reference indicate like parts in the several figures of the drawing.

Most of the working parts of this invention are arranged within a metal housing or casing which also forms a supporting frame therefor and which comprises front and rear transverse walls 10, 11, two longitudinal side walls 12 and a top 13 connecting the side walls, leaving the lower end of the housing open, as shown at 14 in Figs. 1 and 2. This housing is secured to a wall 15 of the car by fastening bolts 16 extending lengthwise through the upper parts of the front and rear walls and the adjacent part of the car wall 15, said bolts being surrounded within the housing between its front and rear walls by a sleeve 17 so as to serve as spacers between the same.

Within the lower front part of the casing or housing is arranged a drum or winding wheel 18 around which passes a flexible draft member 19 having preferably the form of a chain which connects said drum with the shoes of the brake mechanism to be operated. As usual a forward rotation of this drum causes the chain to be wound thereon and the brake shoes to be pressed against the wheels of the car and a reverse movement of the drum permits the load on the chain to unwind the same from the drum and release the shoes from the wheels of the car.

This drum rotates on a pin or arbor 9 arranged lengthwise in the lower part of the housing and is supported at its front and rear ends on the front and rear walls of the same. On its rear end the drum is provided with a gear wheel which is preferably cast integrally therewith. Above the chain drum and gear wheel is arranged a main operating shaft which preferably comprises a front section 21 journaled in a bearing 22 in the front wall of the housing and a rear section 23 which is journaled in a bearing 24 in the rear wall of the housing in axial alinement with the front section, as shown in Fig. 1. At its front end this front section of the operating shaft is provided with a hand wheel 25 whereby this shaft may be turned manually either forwardly for applying the brake mechanism or rearwardly for releasing the same.

Coupling and uncoupling of the front and rear sections of the operating shaft is effected by means of a clutch which comprises a front or abutment clutch disk 26 which turns with this shaft and preferably is cast integrally therewith on the rear end thereof and arranged adjacent to the inner side of the front wall of the housing. The rear shaft section is provided on its front end with a rear or controlling clutch disk 27 which turns therewith and preferably formed integrally thereon by casting. On the periphery of the rear shaft section between the rear clutch disk and the rear wall of the housing the same is provided with an annular row of gear teeth 28 forming a gear pinion which meshes with the teeth of the gear wheel 20. Between the front and rear clutch disks is arranged a detent clutch disk 29 which is adapted to be gripped between the front and rear clutch disks 26, 27 or released therefrom for coupling or uncoupling the clutch, suitable friction disks 30, 31 being interposed between opposite sides of the detent disk and the front and rear clutch disks for producing an effective grip between the same when closing the clutch and also a prompt release of this grip when opening the clutch.

The detent disk is permitted to turn forwardly freely but backward movement of the same is prevented by a one-way ratchet device consisting preferably of an annular row of ratchet teeth 32 formed on the periphery of the detent disk and a ratchet pawl or dog 33 pivoted on the adjacent spacer sleeve 17 and held yieldingly in engagement with the ratchet teeth of the detent disk by means of a spring 34 connecting this pawl with another spacing sleeve, as shown in Figs. 2 and 3, or other available part of the housing or frame.

Cam or wedge means are provided whereby during a forward turning movement of the front shaft section the rear shaft section is moved longitudinally forward and causes the clutch to be closed or coupled so that the front and rear shaft sections turn together and operate to turn the gear pinion, gear wheel and drum forwardly for winding the brake chain on the drum and applying the brake mechanism, but when the front shaft section is turned backwardly the rear shaft section will be moved longitudinally rearward so that the clutch will be opened and release the gear pinion, gear wheel and drum and permit these members to be turned backwardly and produce a limited releasing action of the brake mechanism. The cam means for this purpose shown in Fig. 1 of the drawing consist of a male or externally threaded screw shank or bolt 35 projecting axially forward and from the front end of the rear shaft section engaging with a female or internally threaded socket or nut 36 formed axially in the rear end of the front shaft section, as shown in Fig. 1.

Upon turning the front section 21 of the operating shaft forwardly or in a clockwise direction by means of the hand wheel 25 when viewed from the front side of this wheel, the cooperating helical faces of the screw shank 35 and the socket 36 produce a cam or wedging action whereby the rear or controlling clutch disk 27 is moved axially forward relative to the front or abutment clutch disk 26 whereby the detent disk 29 is gripped between the front and rear clutch disks and the several disks 26, 27 and 29 are coupled in the manner of a clutch and caused to turn forwardly with the operating shaft as a unit. While the operating shaft and clutch members are thus turning forwardly, the gear pinion 28, gear wheel 20 and drum 18 also turn forwardly or in the direction which the brake chain 19 is moved forwardly and wound upon the drums and thereby causes the brake shoes to be pressed against the wheels of the car to produce a braking effect.

During this forward movement of the several disks of the clutch the teeth of the detent disk trip idly past the detent pawl 33 but when the forward rotary movement of the operating shaft and the parts connected therewith is discontinued the same together with the drum are held in this position by engagement of the detent pawl 33 with the respective ratchet tooth of the detent wheel, whereby the brake mechanism is held in its tightened or applied position and either stops or retards the movement of the wheels of the car.

When it is desired to relieve or release the brake mechanism the hand wheel 25 is turned backwardly together with the front shaft section 21 and the threaded socket 36 of the latter unscrews more or less from the threaded shank 35 of the rear shaft section. At this time the detent disk is held against backward rotation by the pawl 33, thereby relieving the pressure of the controlling clutch disk 27 against the rear or inner side of the detent disk 29. This permits the gear pinion 28, gear wheel 20 and drum 18 to be turned backwardly by the load on the chain 19 which connects the latter with the brake shoe actuating mechanism and thereby reduces the braking effect accordingly. The instant, however, that the backward rotation of the front shaft section and its front clutch disk and hand wheel ceases, the backward pull on the brake chain 19 will momentarily continue the backward rotation of the rear shaft section relative to the front shaft section, whereby the cooperating helical faces of the screw shank 35 and screw socket 36 cause the front and rear clutch disks 26, 27 to be moved axially toward one another and pressed against opposite sides of the detent disk, thereby arresting the further releasing effect of the brake mechanism.

In the absence of any means for limiting the extent of the relative longitudinal separating movement of the front and rear shaft sections 21 and 23 it is possible for the rear shaft section, gear wheel, drum and other parts connected therewith, to become stuck due to freezing, corrosion or other cause and thus prevent the brake mechanism from relaxing and releasing the brake shoes. Unless some means are provided which cooperate directly with the shaft sections the same are also liable to be separated lengthwise to such an extent that some of the parts mounted on these shaft sections would engage with the front and rear walls with such pressure as to break the same and render the brake mechanism as a whole inoperative. To avoid this the following stop means are provided:

The numeral 37 represents a coupling rod or bolt which is arranged axially within the front and rear shaft sections 21, 23 and connected with said front shaft section so as to move therewith by means of an external screw thread 38 formed on the front end of this shaft section and engaging with an internally threaded socket 39 in the intermediate part of said front shaft section. The coupling bolt and rear section of the operating shaft are slidable and rotatable relative to one another and at its rear end the coupling bolt is provided with a round head 40 which is arranged in a socket 41 at the rear end of the rear shaft section and forms a forwardly facing shoulder 42 which is adapted to engage a rearwardly facing stop shoulder 43 formed by the bottom of the socket 41.

When the brake mechanism has been applied by the forward rotation of the hand wheel 25, the stop shoulder 43 on the rear shaft section forming the hub of the gear pinion 28 is spaced from the stop shoulder 42 on the rear end of the coupling bolt, as shown in Fig. 1. If during the subsequent backward rotation of the hand wheel 25 for the purpose of releasing the brake mechanism the frictional engagement of the rear clutch or controlling disk 27 with the detent disk is relieved but this rear clutch disk, gear pinion, gear wheel and drum still do not turn backwardly independently of the detent disk due to insufficient pull of the brake rigging or freezing or corrosion of the parts, then a continued backward rotation of the hand wheel 25 and front shaft section 21 will cause the screw joint 35, 36 between the latter and the rear shaft section to separate these shaft sections lengthwise until the rearwardly facing shoulder 43 of the front shaft section and forwardly facing shoulder 42 of the coupling bolt are engaged after which these two shaft sections are locked together and virtually form one piece and thus enable the operator to manually turn backwardly the gear pinion 28, gear wheel 20, drum 18 and associated parts and forcibly release the brake mechanism under the conditions above mentioned.

If desired the internal and external members of the helical or cam connection between the front and rear operating shaft sections may be reversed, as shown in Fig. 4. In this alternative construction an externally screw thread shank 44 is formed on the inner end of the front shaft section and engages with an internally screw threaded socket 45 on the front end of the rear operating shaft section. A coupling rod or bolt is employed having its body 46 arranged axially in both of the operating shaft sections and provided at its rear end with an external screw thread 47 which engages with an internally screw threaded socket 48 on the rear shaft section and also provided on its front end with a round head 49 arranged in a socket 50 on the front shaft section and forming a rearwardly facing shoulder 51 which is adapted to engage a forwardly facing shoulder 52 formed by the bottom of the socket 50.

In this construction the hand wheel 25 is secured to the front end of the front section 21 of the operating shaft by a screw 53 bearing against the front side of the hub of this wheel and engaging with the front end of the socket 50. The operation of this apparatus including the clutch, detent means and the coupling bolt are the same as corresponding parts shown in Figs. 1–3.

In both forms of this invention the means for limiting the separation of the operating shaft sections is very simple and inexpensive in construction, the same are strong and durable, capable of being readily assembled and disassembled for inspection and repairs and the same permit of making the rotary members of this operating mechanism as a unit which is self contained and at no time exerts a pressure on the walls of the enclosing housing which otherwise would be liable to break the latter and prevent operation of the brake mechanism.

I claim as my invention:

1. A hand brake mechanism for cars including two operating shaft sections, a hand operated member connected with one of said sections, means for transmitting motion from the other section to the parts to be actuated, a clutch for coupling and uncoupling said shaft sections including a one-way ratchet device, helical means for causing relative longitudinal movement of said shaft sections upon rotating one of said sections, and means for limiting the separation of said shaft sections including a coupling rod axially in said shaft sections, provided at one end with an externally screw threaded shank engaging with an internally screw threaded socket on one of said shaft sections and provided at its opposite end with a head which is arranged in a socket on the other shaft section and forms a stop shoulder adapted to engage with a stop shoulder formed by the bottom of said socket.

2. A hand brake mechanism for cars including front and rear shaft sections, a hand wheel connected with the front shaft section, a gear pinion arranged on the rear shaft section and forming part of the means for transmitting motion to the parts to be actuated, an externally screw threaded shank arranged at one end of one of said shaft sections and engaging with an internally screw threaded socket in the opposing end of the other shaft section, a clutch for coupling and uncoupling said shaft sections including front and rear clutch disks turning with said front and rear shaft sections and an intermediate clutch disk adapted to be gripped on its opposite sides by said front and rear clutch disks, ratchet means which permit said intermediate disk to turn only in one direction, and a coupling bolt having its body arranged axially in said shaft sections and provided at one end with a screw thread engaging with a screw threaded socket in one of said shaft sections and provided at its opposite end with a head arranged in a socket in the other shaft section and forming a shoulder adapted to engage with a shoulder formed by the bottom of the last mentioned socket.

3. A hand brake mechanism for cars comprising front and rear shaft sections, a hand operated member connected with said front section, means for transmitting motion from the rear shaft section to the parts to be actuated, a clutch for coupling and uncoupling said shaft sections including a one-way ratchet device, helical means for causing relative longitudinal movement of said sections upon rotating one of said sections, including an internal screw thread on said front shaft section and an external screw thread on said rear shaft section engaging said internal screw thread, and means for limiting the separation of said shaft sections including a bolt having its body arranged axially in said shaft sections and provided at its front end with an external screw thread which engages with an internal threaded opening in said front shaft sections and provided at its rear end with a head adapted to engage with an internal stop shoulder on the rear shaft section.

4. A hand brake mechanism for cars comprising front and rear shaft sections, a hand operated member connected with said front section, means for transmitting motion from the rear shaft section to the parts to be actuated, a clutch for coupling and uncoupling said shaft sections including a one-way ratchet device, helical means for causing relative longitudinal movement of said sections upon rotating one of said sections including an internal screw thread on said rear shaft section and an external screw thread on said front shaft section engaging with said internal screw thread, and means for limiting the separation of said shaft sections including a bolt having its body arranged axially in said shaft sections and provided at its rear end with an external screw thread engaging with an internally screw threaded opening in the rear shaft section and provided at its front end with a head adapted to engage with an internal shoulder on the front shaft section.

5. A hand brake mechanism for cars comprising front and rear shaft sections, a hand operated member connected with said front section, means for transmitting motion from the rear shaft section to the parts to be actuated, a clutch for coupling and uncoupling said shaft sections including a one-way ratchet device, helical means for causing relative longitudinal movement of said sections upon rotating one of said sections including an internal screw thread on said rear shaft section and an external screw thread on said front shaft section engaging with said internal screw thread, means for limiting the separation of said shaft sections including a bolt having its body arranged axially in said shaft sections and provided at its rear end with an external screw thread engaging with an internally screw threaded opening in the rear shaft section and provided at its front end with a head adapted to engage with an internal shoulder formed at the inner end of a bore in the front part of the front shaft section, a manual operating member mounted on the front part of said front shaft section, and a fastening screw having a threaded body engaging with the front end of said bore and having a head engaging with said operating member.

EVERARD C. MERSEREAU.